United States Patent [19]

Yasui

[11] Patent Number: 5,373,911
[45] Date of Patent: Dec. 20, 1994

[54] VEHICLE GUIDANCE CONTROL SYSTEM

[75] Inventor: Yoshiyuki Yasui, Davis, Calif.

[73] Assignee: Aisin Seiki Kabushiki Kaisha, Kariya City, Japan

[21] Appl. No.: 123,985

[22] Filed: Sep. 21, 1993

Related U.S. Application Data

[63] Continuation of Ser. No. 807,248, Dec. 18, 1991, abandoned.

[51] Int. Cl.5 .......................... B62D 5/04; B62D 5/06
[52] U.S. Cl. ..................................... 180/168; 180/79.1; 364/424.05
[58] Field of Search ............... 180/167, 168, 169, 79.1; 364/424.05, 424.01

[56] References Cited

U.S. PATENT DOCUMENTS

| | | | |
|---|---|---|---|
| 2,996,137 | 8/1961 | Yaohan Chu et al. | 180/168 |
| 3,085,646 | 4/1963 | Paufve | 180/168 |
| 3,456,752 | 7/1969 | Fonda . | |
| 3,498,630 | 3/1970 | Crawford . | |
| 3,716,110 | 2/1973 | Fonda . | |
| 3,866,706 | 2/1975 | Lincke . | |
| 4,049,961 | 9/1977 | Marcy | 180/169 |
| 4,144,948 | 3/1979 | Sergay . | |
| 4,189,955 | 2/1980 | Bishop . | |
| 4,418,780 | 12/1983 | Ito et al. . | |
| 4,440,254 | 4/1984 | Shibahata et al. . | |
| 4,441,572 | 4/1984 | Ito et al. . | |
| 4,534,577 | 8/1985 | Howard . | |
| 4,540,059 | 9/1985 | Shibahata et al. . | |
| 4,546,839 | 10/1985 | Noguchi . | |
| 4,549,468 | 10/1985 | Trintignac et al. . | |
| 4,556,116 | 12/1985 | O'Neil | 180/79.1 |
| 4,634,135 | 1/1987 | Nakata et al. . | |
| 4,666,013 | 5/1987 | Shibahata et al. . | |
| 4,705,131 | 11/1987 | Shibahata et al. . | |
| 4,705,132 | 11/1987 | Tsuchiya . | |
| 4,706,771 | 11/1987 | Kawabe et al. . | |
| 4,708,220 | 11/1987 | Noto et al. | 180/79.1 |
| 4,717,175 | 1/1988 | Arai et al. . | |
| 4,718,685 | 1/1988 | Kawabe et al. . | |
| 4,726,603 | 2/1988 | Sugiyama et al. . | |
| 4,735,271 | 4/1988 | Shimizu . | |
| 4,741,409 | 5/1988 | Westercamp et al. . | |
| 4,747,614 | 5/1988 | Kuroyanagi et al. . | |
| 4,758,053 | 7/1988 | Yasuno . | |

(List continued on next page.)

FOREIGN PATENT DOCUMENTS

| | | |
|---|---|---|
| 0352759 | 1/1900 | European Pat. Off. . |
| 0054776 | 6/1982 | European Pat. Off. . |
| 0089631 | 9/1983 | European Pat. Off. . |
| 0150303 | 8/1985 | European Pat. Off. . |
| 150856 | 8/1985 | European Pat. Off. . |
| 0282041 | 9/1988 | European Pat. Off. . |
| 0350020 | 1/1990 | European Pat. Off. . |

(List continued on next page.)

OTHER PUBLICATIONS

"Adaptive Steering", Kaselmann & Keranen, Bendix Technical Journal, Autumm 1969, pp. 26-35.

*Primary Examiner*—Mitchell J. Hill
*Attorney, Agent, or Firm*—Banner, Birch, McKie & Beckett

[57] ABSTRACT

In accordance with the present invention, an automatic lateral guidance control system for motor vehicles is provided which includes a steering servo actuator which steers the vehicle. The steering servo actuator also allows for manual control by the driver. A detector detects when the automatic control is malfunctioning or is not present, and restores manual control to the driver. The system also includes a provision for stability augmentation to compensate for oversteering or understeering.

20 Claims, 8 Drawing Sheets

U.S. PATENT DOCUMENTS

| | | |
|---|---|---|
| 4,759,419 | 7/1988 | Nagae et al. . |
| 4,768,602 | 9/1988 | Inoue et al. . |
| 4,771,846 | 9/1988 | Venable et al. . |
| 4,773,012 | 9/1988 | Ito et al. . |
| 4,793,431 | 12/1988 | Eto et al. . |
| 4,796,720 | 1/1989 | Bauer . |
| 4,800,974 | 1/1989 | Wand et al. . |
| 4,823,898 | 4/1989 | Ogura et al. . |
| 4,828,063 | 5/1989 | Ogura et al. . |
| 4,830,127 | 5/1989 | Ito et al. . |
| 4,830,131 | 5/1989 | Miyoshi et al. . |
| 4,858,713 | 8/1989 | Kawakami et al. . |
| 4,865,146 | 9/1989 | Ohe . |
| 4,878,557 | 11/1989 | Shibahata et al. . |
| 4,881,749 | 11/1989 | Bausch . |
| 4,902,032 | 2/1990 | Krehan et al. . |
| 4,913,249 | 4/1990 | Lang ................................. 180/79.1 |
| 4,921,061 | 5/1990 | Asano . |
| 4,941,097 | 7/1990 | Karnopp et al. . |
| 4,941,542 | 7/1990 | Tomoda et al. . |
| 4,953,654 | 9/1990 | Imesaki et al. . |
| 4,967,865 | 11/1990 | Schindler . |
| 4,970,646 | 11/1990 | Sugasawa et al. . |
| 4,998,593 | 3/1991 | Karnopp et al. . |
| 5,048,627 | 9/1991 | Eguchi et al. . |
| 5,097,917 | 3/1992 | Serizawa et al. . |
| 5,141,069 | 8/1992 | Yasui . |
| 5,156,229 | 10/1992 | Yasui et al. . |
| 5,159,553 | 10/1992 | Karnopp et al. . |

FOREIGN PATENT DOCUMENTS

| | | |
|---|---|---|
| 0351146 | 1/1990 | European Pat. Off. . |
| 0379430 | 7/1990 | European Pat. Off. . |
| 2227986 | 11/1974 | France . |
| 2636288 | 3/1990 | France . |
| 3729898 | 3/1989 | Germany . |
| 3811312 | 10/1989 | Germany . |
| 1411829 | 10/1975 | United Kingdom . |
| 2203395 | 10/1988 | United Kingdom . |

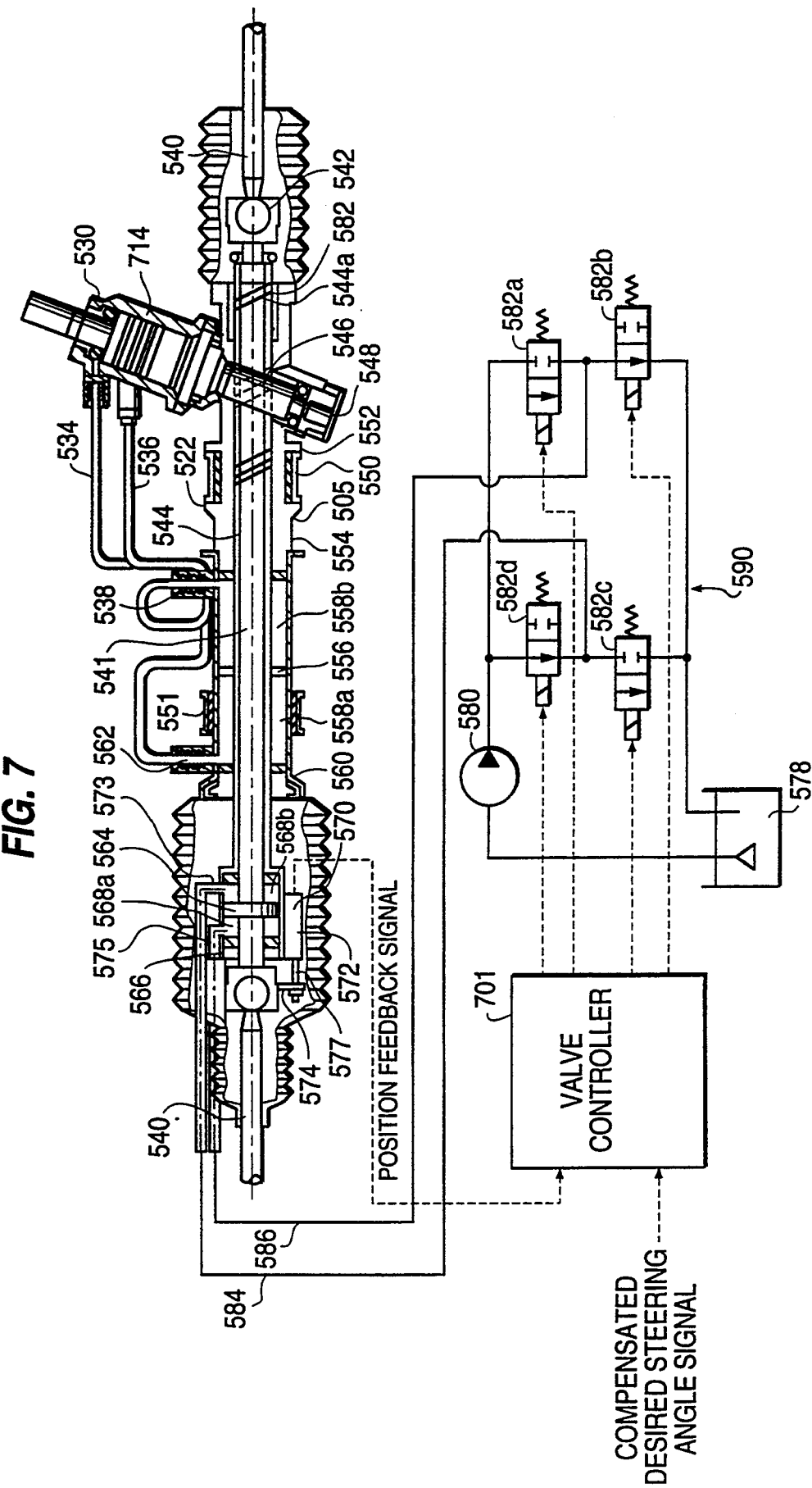

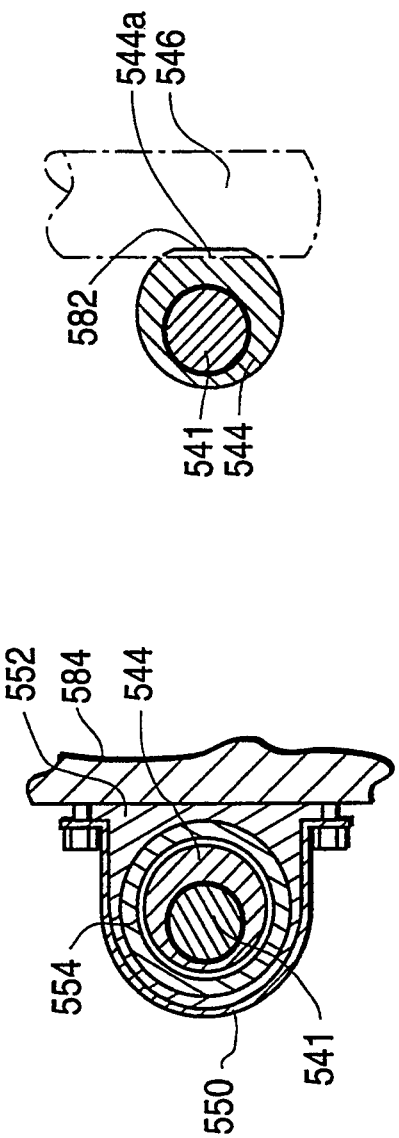

VEHICLE GUIDANCE CONTROL SYSTEM

This application is a continuation of application Ser. No. 07/807,248, filed Dec. 18, 1991 now abandoned.

BACKGROUND OF THE INVENTION

1. Field Of The Invention

The present invention generally relates to an automatic lateral guidance control system for controlling the direction of a moving vehicle, and more particularly, to an improved vehicle controller for use in an automatic lateral guidance control system for controlling the direction of a motor vehicle on a highway. So-called "Automated Highways" are presently being contemplated, which will include vehicular-based systems that will automatically control the motor vehicle's speed, steering and braking, in order to substitute for the driver as a prime source of control over the vehicle. The expected advantages of such systems will be to improve the overall flow of traffic and increase highway safety. The present invention is directed to such a vehicular-based system for automatically controlling vehicle direction.

2. Description of the Prior Art

A variety of conventional guidance systems are used for controlling the movement of vehicles travelling along a predetermined path, for example, as is illustrated in U.S. Pat. No. 4,049,961 to Marcy. Marcy discloses an automatic guidance system for a motor vehicle which includes an optical laser transmitter/receiver assembly. A series of spaced-apart responders (i.e., light reflective devices) are disposed in a single row parallel to the centerline of the roadway, or in a pair of rows on opposite sides of the centerline, for reflecting radiant energy from the laser transmitter back to the receiver. As shown in Marcy, the laser transmitter radiates two overlapping beams which are amplitude-modulated by sine waves that are 180 degrees out of phase. The receiver merges the two reflected beams into a single beam that is subject to a eyelid translatory shift in amplitude. The amplitude shift is translated into a voltage whose amplitude varies in accordance with the position or the vehicle. In other words, a comparison of the phase differences between the transmitted and reflected beams provides a determination of the vehicle's location with respect to the reflectors.

Stability augmentation systems which provide adaptive steering or correction for understeering or oversteering by comparing a desired vehicle steering condition with an actual vehicle steering condition, and correcting the steering angle of the steered wheels until the actual steering condition equals the desired steering condition are known. In such systems, both the vehicle speed and the steering wheel input angle, $\delta_{sw}$, are converted by a microcontroller into a desired yaw rate $\phi_d'$. The actual yaw rate $\phi_a'$ is either measured directly or may be calculated. The controller then compares the actual and desired yaw rates, and corrects the angle of the steerable wheels independently of the steering input at the steering wheel until the actual and desired yaw rates are equal.

SUMMARY OF THE INVENTION

Accordingly, it is an object of the present invention to provide an improved automatic guidance control system for controlling the direction of a moving vehicle without the need for human intervention, but which allows full manual control when desired.

It is yet another object of the present invention to provide an improved automatic guidance control system having an arrangement for detecting a malfunction of the system and returning control of the vehicle to the driver.

These objects are provided according to the present invention which is directed to an apparatus for automatically guiding a moving vehicle.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIGS. 7, 7a and 7b show a third embodiment of a steering servo mechanism for an automatic control system.

DETAILED DESCRIPTION OF THE PREFERRED EMBODIMENTS

The present invention has applicability to automatic guidance control systems which receive information indicative of the vehicle's position relative to the road, and automatically converts that information to a desired steering angle $\delta_d$ for the vehicle. Such information may come from a plurality of roadside responders, as discussed above with respect to the Marcy patent. As shown in the figures, such systems, which do not form a part of the invention, may include a microcontroller 12 which receives information from vehicle position sensing system 16 and vehicle speed sensor 32. Sensing system 16 may be a preview system which views the road ahead of a moving vehicle. Microcontroller 12 utilizes this information to calculate and output a desired steering heading angle $\delta_d$. As discussed below, microcontroller 12 also plays a part in providing control according to the present invention.

Figure 1:
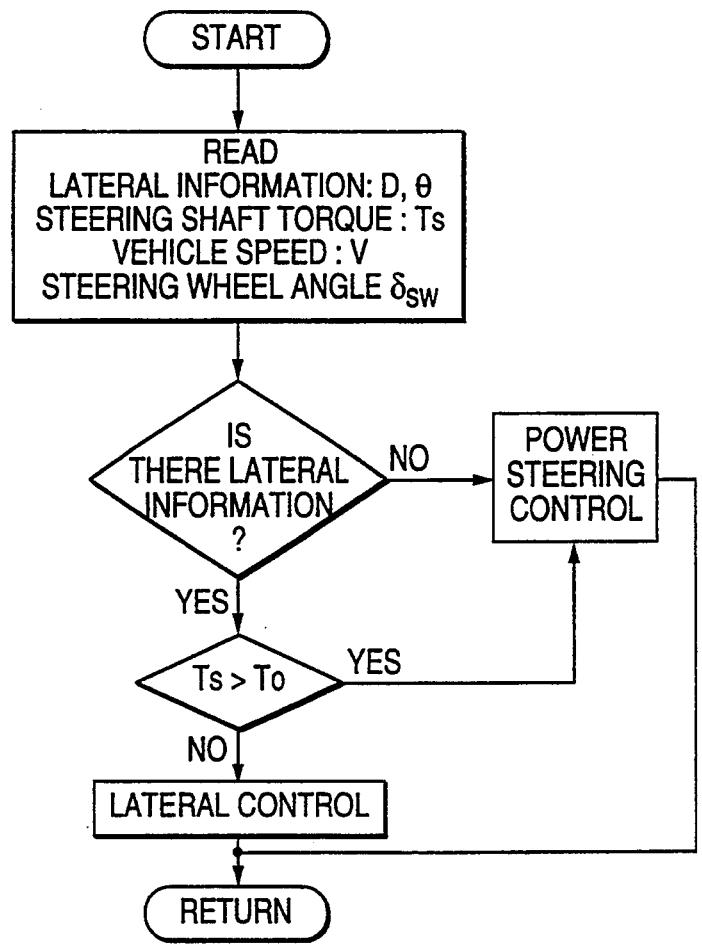
FIG. 1 illustrates a sequence of steps which may be performed according to the invention to determine if a driver is manually steering a vehicle in order to deactivate an automatic lateral control system.
Figure 2:
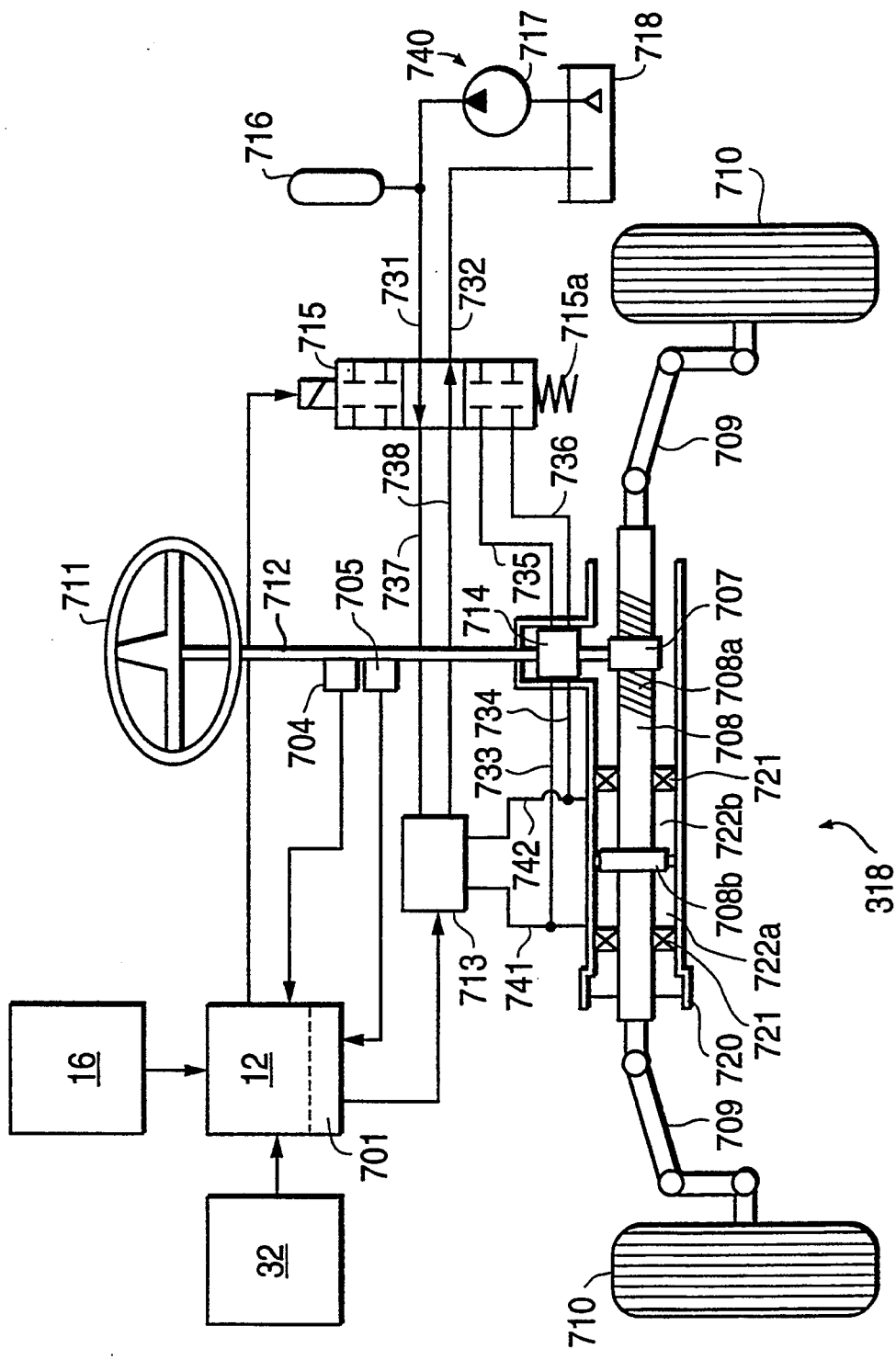
FIG. 2 shows a first embodiment of a steering servo mechanism for an automatic control system according to the present invention and which includes elements for deactivating the system according to the steps shown in FIG. 1.

With further reference to FIGS. 1-2, a sequence of steps which may be followed to determine if an automatic control system should be deactivated, and a first embodiment of steering servo mechanism 18 according to the invention for receiving the output of microcontroller 12, that is, desired steering angle $\delta_d$, and for steering the vehicle in accordance therewith is disclosed. Steering servo system 18 includes many elements of a conventional power steering apparatus, including steering rod 708 linked at both ends to tie rods 709, which are further linked to steerable wheels 710. Steering rod 708 includes rack portion 708a formed thereon. Steering rod 708 is disposed so as to be laterally moveable within power steering housing 720 which is fixed to the vehicle. Steering rod 708 includes piston element 708b disposed thereon. Seal elements 721 are disposed within housing 720, on opposite sides of piston element 708b, and define chambers 722a and 722b within housing 720. Steering rod 708 is free to move laterally within housing 720, for the extent of the width of chambers 722a and 722b. Steering servo mechanism 18 also includes conventional pinion 707 which is linked to steering wheel 711. Pinion 707 meshes with the teeth of rack portion 708a. Conventional power steering valve 714 is connected to pinion 707 and steering shaft 712.

Power steering fluid circuit 740 includes oil pump 717, oil reservoir 718 and accumulator 716. Power steering fluid lines 731 and 732 link pump 717 and reservoir 718, respectively, with power steering valve 714, via conventional bi-positional solenoid valve 715, and fluid lines 735 and 736. Power steering lines 733 and 734 link power steering valve 714 with chamber 722a and 722b formed on either side of piston element 708b. During normal power steering control, that is, when solenoid valve 715 is in the "lower" position linking lines 731 and 732 with lines 735 and 736, power steering valve 714 controls the flow of fluid to lines 733 and 734 in dependence upon the direction and the degree to which steering wheel 711 is turned. This type of control is provided in a conventional manner.

Accordingly, when steering wheel 711 is turned, steering rod 708 is moved laterally due to rotation of pinion 707 which interfits with rack portion 708a. Additionally, steering rod 708 moves laterally since the pressure in one or chambers 722a and 722b becomes increased while the pressure in the other chamber is decreased, due to the fact that one chamber is linked to pump 717 while the other is linked to reservoir 718. Lateral movement of steering rod 708 causes angular movement of steerable wheels 710 to steer the vehicle in accordance with the steering angle input $\delta_{sw}$ of steering wheel 711. Although bi-positional solenoid valve 715 has been described as conventional, it is not conventional to utilize valve 715 in a prior art power steering system. In fact, valve 715 would be unnecessary in a conventional power steering system. Thus, in the prior art power steering system, pump 717 and reservoir 718 would be linked directly to power steering valve 714 and valve 714 would always control the link of the pump and the reservoir to chambers 722a and 722b to provide conventional power steering control in accordance with the steering input from steering wheel 711.

Steering servo system 18 further includes conventional steering torque sensor 704 which detects the torque $T_s$ applied to steering shaft 712, and conventional steering angle sensor 705 which detects the angle $\delta_{sw}$ through which steering shaft 712 and thus steering wheel 711 has been turned. Since steering shaft 712 is directly connected to steerable wheels 710 through rod 708 and pinion 707, and since the gear ratio of the pinion and rack portion 708a are known, when steering angle sensor 705 outputs steering angle $\delta_{sw}$ which is indicative of the angle through which steering wheel 711 is turned, then the actual angle $\delta_a$ through which steerable wheels 710 have been turned is known. The outputs of sensor 704 and 705 are received by microcontroller 12.

Lateral control valve 713 is linked in fluid communication with pump 717 by solenoid valve 715 and fluid lines 731, 732, 737 and 738. Lateral control valve 713 is linked to chambers 722a and 722b by fluid lines 741 and 742, respectively. Lateral control valve 713 may comprise, for example, a known tri-positional solenoid valve having a first position in which, chamber 722a would be linked to line 737 and chamber 722b would be linked to line 738, a second position in which the opposite would be true, and a third position in which both chambers would be isolated from lines 737 and 738. Alternatively, lateral control valve 713 could comprise a servovalve, a linear solenoid valve or a plurality of bi-positional on/-off valves. The operation of lateral control valve 713 is controlled by microcontroller 12 through valve controller 701. Valve controller 701 is in fact, a part of microcontroller 12, although it is shown and discussed separately for convenience of description.

In operation, microcontroller 12 controls the position of both lateral control valve 713 and solenoid valve 715. With reference to the flow chart shown in FIG. 1, microcontroller 12 first determines if lateral information is being received from preview sensor 16. If controller 12 is not provided with lateral information, that is, the system for detecting the vehicle location in the roadway is not functioning and outputting the information, for example, if the vehicle is not driving on an automated roadway, then controller 12 controls solenoid valve 715 to be in the lower position against the force provided by restoring spring 715a. In this position, pump 717 and reservoir 718 are linked to power steering valve 714, and lateral control valve 713 is isolated from pump 717 and reservoir 718. Thus, pump 717 and reservoir 718 are linked to chambers 722a and 722b through power steering valve 714, and normal power steering control is provide in response to driver input at steering wheel 711.

If controller 12 is provided with lateral information, then steering shaft torque $T_s$ detected by torque sensor 704, is compared with threshold torque value $T_o$. During automatic control, the driver will not touch steering wheel 711, and all rotation or steering wheel 711 and shaft 712 will be due to lateral movement of rack 708a and corresponding rotation of pinion 707 due to the control provided by controller 12 through valve 713. A small steering shaft torque $T_s$ will be present during automatic control due to the mass of the steering wheel and friction between the steering supports and steering shaft when the steering shaft is rotated due to rotation of pinion 707. However, if the driver is providing steering input by turning steering wheel 711, a large steering shaft torque $T_s$ will occur. If the torque $T_s$ detected by sensor 705 exceeds a maximum or threshold torque $T_o$ which would be expected due to the automatic control, then it is clear that the driver is attempting to provide normal power steering. Accordingly, in this situation solenoid 715 remains in or is returned to the lower position by valve controller 701, linking pump 717 and reservoir 718 with power steering valve 714, and normal power steering control is provided in response to the driver input at the steering wheel.

Finally, if $T_s \leq T_o$, then solenoid valve is allowed to be in the upper position due to the force provided by spring 715a, as shown in the figure. Pump 717 and reservoir 718 are linked to lateral control valve 713 and power steering valve 714 is isolated. Automatic steering is provided by microcontroller 12 which controls the position of valve 718 to control the links of chambers 722a and 722b with pump 717 and reservoir 718 so as to cause lateral movement of steering rod 708 and steer steerable wheels 710 in accordance with a desired steering angle $\delta_d$, which is also calculated by microcontroller 12, as discussed above. In the system shown, since rack portion 708a is linked to steering shaft 712 by pinion 707, movement of steering rod 708 due to the control provided by controller 12 through valve 713 and power steering fluid circuit 740 will result in rotation of shaft 712. The output signal of steering angle (steering input) sensor 705 will always correspond to the actual steering angle $\delta_a$ of the steerable wheels. Thus, due to sensor 705, microcontroller 12 always receives signals indicating the actual steering angle $\delta_a$ of the steerable wheels, and these signals are used in controlling lateral control valve 713 in order to cause the vehicle to achieve desired steering angle $\delta_d$. Alternatively, the actual steering angle $\delta_a$ of the steerable wheels may be detected by a linear potentiometer disposed between the end of housing 720 and a portion of steering rod 708 extending beyond the housing, as shown below with reference to an automatic control system which includes adaptive control.

Figure 3:
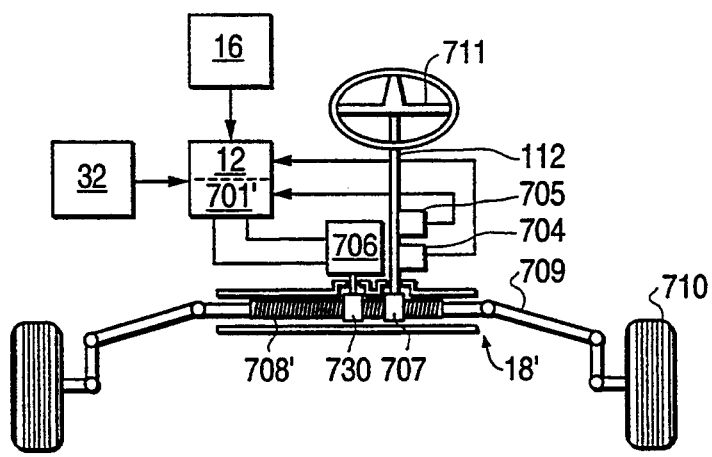
FIG. 3 shows a second embodiment of a steering servo mechanism for an automatic control system according to the present invention and which includes elements for deactivating the system according to the steps shown in FIG. 1.

With respect to FIG. 3, second embodiment 18' of a steering servo system is shown. The second embodiment is similar to the first embodiment except that the hydraulic power steering mechanism is replaced by an electric power steering mechanism including electric motor 706. Steering rod 708' includes a rack portion throughout the exterior surface thereof, and will be referred to as rack 708'. Electric motor 706 is linked to rack 708' by pinion 730.

In operation, during normal power steering control, that is, when no lateral information is provided or when $T_s > T_o$, microcontroller 12 controls motor 706 through motor controller 701' to provide power steering on the basis of the detected steering wheel angle $\delta_{sw}$ as well as vehicle speed V in a known manner. When automatic control is to be provided, that is, when lateral information is provided to microcontroller 12 and $T_s \leq T_o$, microcontroller 12 outputs a desired steering angle $\delta_d$ as discussed above, and controls electric motor 706 to provide power steering on the basis of this signal, as well as the basis of the present angle of the steering wheel $\delta_{sw}$ as detected by sensor 704. That is, pinion 730 is rotated until $\delta_{sw} = \delta_d$. Thus, microcontroller 12 functions to provide the desired steering angle in both normal power steering and automatic control.

In stability augmentation systems, with the exception of the adaptive control, the vehicle is steered entirely according to driver input at the steering wheel. In known automatic control systems, the vehicle is steered entirely according to the output of the controller, except when no lateral information is provided or when the driver assumes control of the vehicle by turning the steering wheel. In the system discussed below, both automatic control and stability augmentation are provided, with the desired yaw rate calculated on the basis of the desired steering input provided by the controller.

In fact, the controller not only provides the desired steering angle $\delta_d$ to the steering servo mechanism 18 on the basis of the calculated desired course, but also provides a correction angle based on the comparison of the actual and desired yaw rates. That is, in the system of the present invention, single controller 900 performs both automatic lateral control and stability augmentation.

Figure 4:
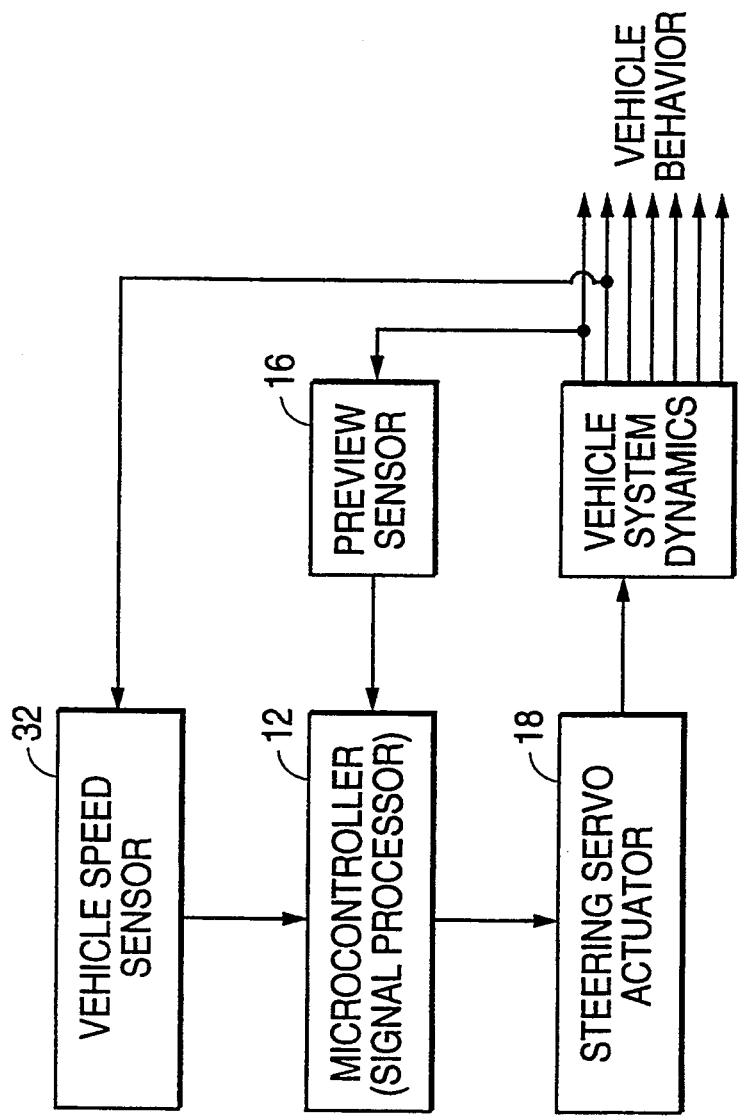
FIG. 4 is an overall block diagram of an automatic vehicle lateral control system showing the effect of vehicle system dynamics on vehicle behavior.

FIG. 4 discloses a block diagram showing the control provided by an automatic control system without stability augmentation. As discussed above, preview sensor 16 obtains information regarding the location of the vehicle relative to the road, and provides the information to microcontroller 12. Vehicle speed sensor 32 provides the vehicle speed information to microcontroller 12. Microcontroller 12 converts this information and outputs a desired steering angle $\delta_d$ for the steerable wheels to steering servo system 18, based on the information provided by preview sensor 16.

However, in practice, the actual vehicle behavior is dependent upon the vehicle system dynamics, for example, center of gravity location of the vehicle, mass, degree of tire wear, or suspension of the vehicle, which vary depending upon the vehicle, as well as changing road conditions caused by environmental factors such as rain. Thus, the vehicle behavior may vary from the expected behavior, during automatic control without stability augmentation. With reference to FIG. 4, the variance in the vehicle behavior may cause the vehicle to deviate from the desired course. Although the sensing system will continue to output the position of the vehicle relative to the road, if the vehicle system handling dynamics are not taken into account in the steering output to the steering servo system, the vehicle will continually be steered in deviation from the desired course. In addition, should the sensing system be defective such as to output incorrect information, if the driver is not paying attention to the road, the vehicle may deviate dangerously from the desired course before the driver can manually correct the course.

Figure 5:
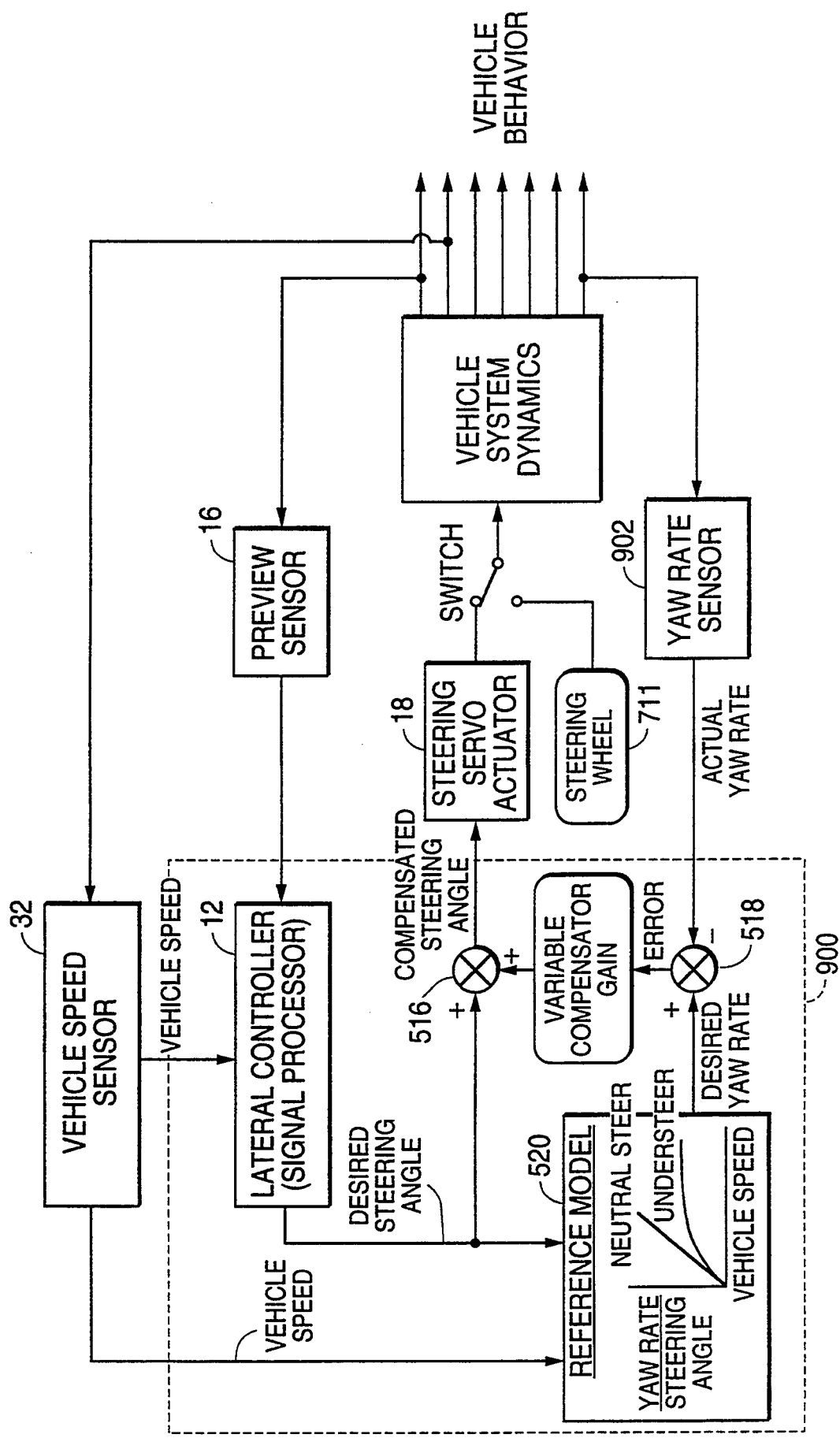
FIG. 5 is a block diagram showing an automatic vehicle lateral control system including a stability augmentation system according to the invention.

These problems are avoided in the automatic control system with stability augmentation shown in the block diagram of FIG. 5. Information from preview sensor 16 and the vehicle speed are inputted to microcontroller 12. Microcontroller 12 outputs a desired steering angle $\delta_d$ and provides it to both summing junction 516 and reference model 520. As shown in FIG. 5, both summing junctions 516 and 518 and reference model 520 form part of overall controller 900 which includes microcontroller 12 as well. Of course, although a single microprocessor 900 may perform all three functions, for convenience of description of the system, microcontroller 12 is shown as a separate part of overall controller 900, and is labeled as a "lateral controller" in order to clearly show and distinguish from each other both the automatic control and the adaptive steering functions.

The vehicle speed is also provided to reference model 520. Reference model 520 calculates a desired yaw rate $\phi'_d$ and outputs it to summing junction 518. Summing junction 518 also receives the actual yaw rate $\phi'_a$ from yaw rate sensor 902. The difference or error $\phi'_{error}$ between desired yaw rate $\phi_d'$ and actual yaw rate $\phi_a'$ is outputted, and controller 900 applies a gain $K_c$. In practice, the value of the gain will be experimentally adjusted, and may be an experimentally determined gain schedule which is a function of the vehicle speed. A gain of 4.0 has been used in computer simulations. Summing junction 516 converts desired steering angle $\delta_d$ and the gain compensated error $\phi'_{error}$ into a compensated steering angle $\delta_c$ according to the formula:

$$\delta_c = \delta_d + K_c \phi'_{error}, \quad (1)$$

which is outputted to the steering servo system. Both the gain schedule and the reference model would be stored in the memory of controller 900.

Since the actual vehicle system dynamics, that is, the yaw rate and the vehicle speed, are taken into account before an output signal is sent to steering servo system 18, the differences between the expected movement of the vehicle and the actual movement of the vehicle due to the steering commands may be taken into account before the vehicle is steered, so as to provide a positive feedback type of control. That is, since before each steering correction is performed, the actual yaw rate is detected and compared to the desired yaw rate which would be expected due to actuation of the steering servo in accordance with the output of microcontroller 12, the deviation between the desired steering path and the actual steering path caused by the dynamics of a particular vehicle is constantly corrected. Although in the above description the actual yaw rate was detected and compared with a desired yaw rate, the same control could be provided by detecting an actual lateral acceleration and comparing it with a desired lateral acceleration. FIG. 5 also shows a switch which would allow both automatic control and stability augmentation to be terminated, and resumption of normal steering based on the steering wheel input.

Figure 6:
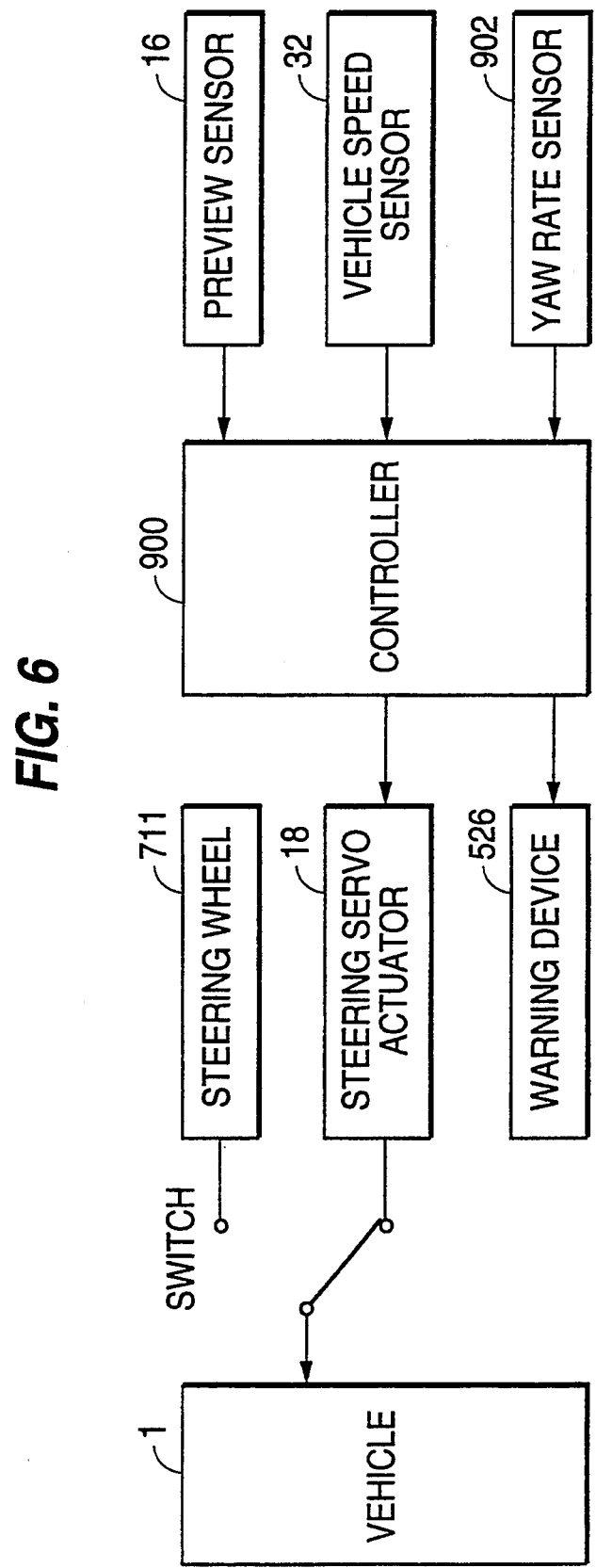
FIG. 6 is a simplified block diagram showing the system of FIG. 5 including a warning device.

FIG. 6 is a simplified block diagram of the system shown in FIG. 5, and also includes warning device 526 which receives the output of overall controller 900. When there is no signal from preview sensor 16, it is clear that either sensor 16 has failed or the vehicle is no longer on a road which accomodates the automated steering. In either case, overall controller 900 switches control of the vehicle from the steering system to the steering wheel. With respect to the embodiment of FIG. 2, valve 715 would be switched to the lower position in which the link between chambers 722a and 722b and power steering pump 716 would be controlled by power steering valve 714. In FIG. 3, although microcontroller 12 would still control electric motor 706, it would do so in direct accordance with steering wheel angle sensor 705, that is, in accordance with the driver input. In addition, warning device 526 would be sounded to inform the driver of the need for manual control.

It may be difficult for a driver to detect when sensing system 16 is still functioning but is outputting erroneous information, until after the car had deviated dangerously from the road direction. However, when the difference between the actual and desired yaw rates (or lateral accelerations) is above a threshhold value, it is indicative that preview sensor 16 is malfunctioning. That is, a malfunction of preview sensor 16 would result in large deviation of the desired yaw rate $\phi_d'$ as calculated by reference model 520 of controller 900 from the previous actual yaw rate $\phi_a'$ such that the difference would exceed a threshold value. Once again controller 900 would return control of the vehicle to the driver at the steering wheel, and a warning would sound. Similarly, if the difference between the presently calculated desired sleeting angle $\delta_d$ and the previously calculated desired steering angle $\delta_d$ (or the average of previously calculated angles) exceeds a threshold angle, a malfunction will be indicated. In addition, if the estimation of the road geometry performed by microcontroller 12 on the basis of the input from the preview sensor exceeds the known maximum curvature of the road, or if the calculated desired steering angle exceeds a certain threshold value, an error will be indicated. Malfunction detection of this type may be included even if the system does not include stability augmentation.

With reference to FIGS. 7, 7a and 7b, a further embodiment of a steering servo system which may be used for automatic control with stability augmentation is depicted. Of course, this mechanisms could also be used to provide automatic control without stability augmentation. Steering servo system 500 includes steering rod 541 axially slidably mounted within hollow rack cylinder 544, including rack 544a having teeth 582 formed on a portion of its outer circumference. Rack cylinder 544 is eccentrically arranged relative to the steering rod 580, with teeth 582 formed in the resulting thicker portion of rack cylinder 544 to create a proper balance. Rack cylinder 544 is axially slidably mounted within housing 505 formed by axially aligned portions 560, 554, the former constituting a power steering housing and the latter constituting a steering gear housing.

Conventional pinion 546 is mounted within steering gear housing 554 and is mechanically coupled to steering shaft 712, which is further attached to the steering wheel. Pinion 546 meshes with teeth 582 of rack 544a (see FIG. 7b). Steering gear housing 554 includes power steering valve housing 530 from which a pair of fluid lines 534, 536 extend. Lines 534, 536 are connected to fittings 562, 538 carried by power steering housing 560 to communicate with left and right power steering chambers 558a and 558b disposed on opposite sides of power steering piston 556. Piston 556 is formed integrally with rack cylinder 544. That is, piston 556 defines chambers 558a and 558b within housing 560. Conventional power steering control valve 714 is disposed within valve housing 530 and is connected to pinion 546. Power steering control valve 714 controls the flow of power steering fluid from a pump and a reservoir to a respective one of the lines 534, 536, depending upon the direction in which the steering wheel is turned to provide normal power steering control. Although not shown, power steering valve 714 would be linked to a separate pump and reservoir by fluid lines and by solenoid valve 715 as shown in FIG. 2, which would itself be linked to microcontroller 12, so as to allow for normal power steering when preview sensor 16 is detected as malfunctioning or when the vehicle is not on an automated highway. However, as discussed below, during normal power steering control, in the mechanism shown in FIG. 7, augmented control will still be possible by independent movement of steering rod 541 relative to rack cylinder 544.

Housing assembly 505 is mounted to rigid frame 584 of the vehicle by means of a pair of elastic grommets 551, 552. Each grommet is in the form of a hollow cylinder through which a respective part of housing assembly 505 extends. Grommet 551 receives power steering housing 560, and grommet 552 receives steering gear housing 554. Each grommet is bolted to frame 584 by means of bracket 550. Vibrations of the housing are dampened by the grommets.

Secured to opposite ends of steering rod 541 are ball joints 542 which are attached to the steerable wheels by drag links 540 which are further connected to steering arms. Axial displacement of steering rod 541 in either direction produces a change in the steering angle of the steerable wheels, in order to steer the wheels. Axial displacement of steering rod 541 can be produced by steering pinion 546 which effects an axial displacement of rack cylinder 544. Axial displacement of rack cylinder 544 is transmitted to steering rod 541 by a fluid motor including control cylinder housing 566 connected to one end of rack cylinder 544, and piston 564 integrally formed with steerable rod 541. Piston 564 is axially slidable within chamber 568 formed within control cylinder housing 566, dividing chamber 568 into left and right chambers 568a and 568b. Communicating with chambers 568a and 568b on opposite sides of piston 564 are fittings 573, 575 which are coupled to flexible fluid lines 584, 586, respectively. Lines 584, 586 are arranged to receive pressurized fluid from pump 580 after the fluid passes through valve system 590. Valve system 590 is actuated to divert pressurized fluid to one of, or neither of, the lines 584, 586 by valve controller 701 in the manner discussed below. Valve controller 701 may form part of controller 900.

Valve system 590 includes four bi-positional solenoid valves 582a–582d. Valves 582a and 582b are disposed in series between pump 580 and reservoir 578. Valves 582c and 582d are also disposed in series between pump 580 and 578, with the latter pair of valves disposed in parallel with the former pair. Fluid line 586 which is linked at one end to chamber 568a on one side of piston 564 is linked at the opposite end to a location between valves 582a and 582b. Similarly, fluid line 584 which is linked at one end to chamber 568b on the other side of piston 564 is linked at its opposite end to a location between valves 582c and 582d. The positions of valves 582a–582d are controlled by valve controller 701 in accordance with the compensated desired steering angle which is calculated by controller 900 as discussed above. When it is desired to steer the vehicle in one direction, valves 582d and 582b are switched into the open position and valves 582a and 582c are closed, linking chamber 568a with reservoir 578, and chamber 568b with pump 580. Thus, chamber 568b is pressurized with respect to chamber 568a and steering rod 541 moves to the left. When it is desired to steer the vehicle in the opposite direction, valve controller 701 switches valves 582a and 582c to the open position and valves 582b and 582d to the closed position, linking chamber 568b with reservoir 578, and chamber 568a with pump 580. Thus, chamber 568a is pressurized with respect to chamber 568b, and steering rod 541 moves to the right. When it is not desired to steer the vehicle by relative movement of steering rod 541 with respect to rack cylinder 544, all of valves 582 are closed, isolating chambers 568a and 568b from both pump 580 and reservoir 580. Thus, steering rod 541 does not move with respect to rack cylinder 544. In this situation, when cylinder 544 moves laterally, rod 541 moves laterally as well due to the fluid in chambers 568a and 568b.

In this manner, by moving steering rod 541 with respect to rack cylinder 544 and housing 505, the vehicle may be laterally steered to the degree necessary to obtain full automatic control. That is, steering control is provided by opening or closing valves 582, in pairs, as necessary until the desired steering angle is obtained. Since valve controller 701 receives the compensated steering angle, automatic control with stability augmentation is provided. If the driver attempts to provide manual steering or if the automatic control is not provided or is malfunctioning, controller 900 switches the vehicle to normal power steering control by controlling solenoid valve 715 and closing all of valves 582 as discussed above. In this situation, rod 541 does not move with respect to rack cylinder 544, and movement of both rod 541 and cylinder 544 in accordance with the steering wheel input is provided by power steering control valve 714.

In addition, the steering servo system shown in FIGS. 7 can easily provide only stability augmentation without automatic control should the vehicle not be on an automated highway or if the preview sensor system malfunctions. In this situation, with reference to FIG. 5, the steering wheel angle $\delta_{sw}$ would be outputted directly to reference model 520, along with the vehicle speed from the vehicle speed sensor, which would calculate and output a desired yaw rate to summing junction 518. Summing junction 518 would compare the desired yaw rate $\phi_d'$ with the actual yaw rate $\phi_a'$ from yaw rate sensor 802 and calculate the error $\phi'_{error}$, which would be converted to a steering correction by the gain adjustment. This signal would be outputted to summing junction 516 which would receive a zero desired steering angle from microcontroller 12 since there would be no information from preview sensor 16.

Accordingly, the output of controller 900 would represent only the correction angle, and would be sent to valve controller 701 which would open and close the appropriate solenoid valves 582. Simultaneously, normal power steering control would be provided in accordance with rotation of power steering control valve 714, which causes rack cylinder 544 to move relative to housing 505. Since chambers 568a and 568b are pressurized, lateral movement of rack cylinder 544 causes corresponding movement of steering rod 541 to turn the steerable wheels during normal steering control. When stability augmentation is required, one of chambers 568a or 568b will be pressurized relative to the other, causing further relative movement of steering rod 541 in either direction relative to rack cylinder 544. This further relative movement allows for stability augmentation during normal power steering. Therefore, the system shown in FIGS. 7 easily can be designed to provide only normal power steering or normal power steering with stability augmentation, when the automated control is not operating or fails, depending on whether controller 900 is programmed to control valve controller 701 when automatic control is not provided.

Rotary potentiometer 548 is coupled to pinion 546, and measures the amount of rotation of the steering shaft and steering wheel. The output of potentiometer 548 is received by controller 900. Therefore, the steering wheel input angle $\delta_{sw}$ can be known for stability augmentation purposes when the vehicle is steered manually. In addition, since pinion 546 is directly engaged with rack cylinder 544, the lateral displacement of rack cylinder 544 is known as well. Linear potentiometer 570 is mounted on control cylinder housing 566 and includes housing 572 mounted fixed to control cylinder 566 for movement therewith, and rod 577 connected to steering rod 541 by means of bracket 574. Thus, rod 577 is displaced relative to housing 572 in response to relative displacement between steering rod 541 and rack cylinder 544. Potentiometer 570 generates a signal indicative of the relative displacement which is received by controller 900. Since controller 900 receives a signal indicative of the lateral displacement of rack cylinder 544 and a signal indicative of the relative displacement of steering rod 541 with respect to rack cylinder 544, the overall lateral displacement of steering rod 541 can be determined by summing the two quantities. Thus, since steering rod 541 is linked to the steerable wheels, the actual angle $\delta_a$ of the steerable wheels is known at all times. Valve controller 701 receives the signal indicative of the actual angle $\delta_a$ of the steerable wheels as well as the compensated steering angle $\delta_c$ and controls solenoid valves 582 so as to make the angles equal by moving steering rod 541 relative to rack cylinder 544. As discussed above, even when the automated steering system is not functioning, valve controller 701 receives an output indicative of the desired correction angle $\delta_c$ needed to correct an understeer or oversteer situation, and controls solenoid valves 582 to cause steering rod 541 to move relative to rack cylinder 544 in order to provide stability augmentation. This control continues until the actual and desired yaw rates are equal in stability augmentation. Of course, during automatic control, the angle is constantly adjusted to steer the vehicle.

Figure 8:
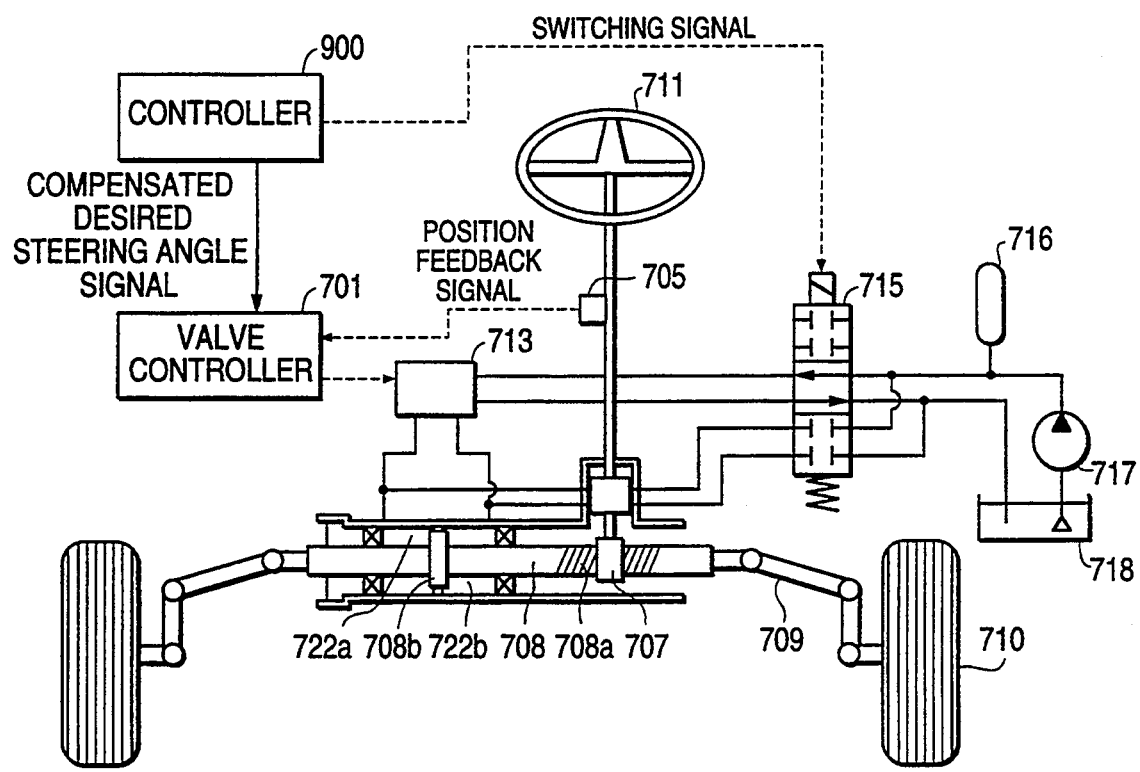
FIG. 8 shows a modification of the steering servo mechanism shown in FIG. 2.
Figure 9:
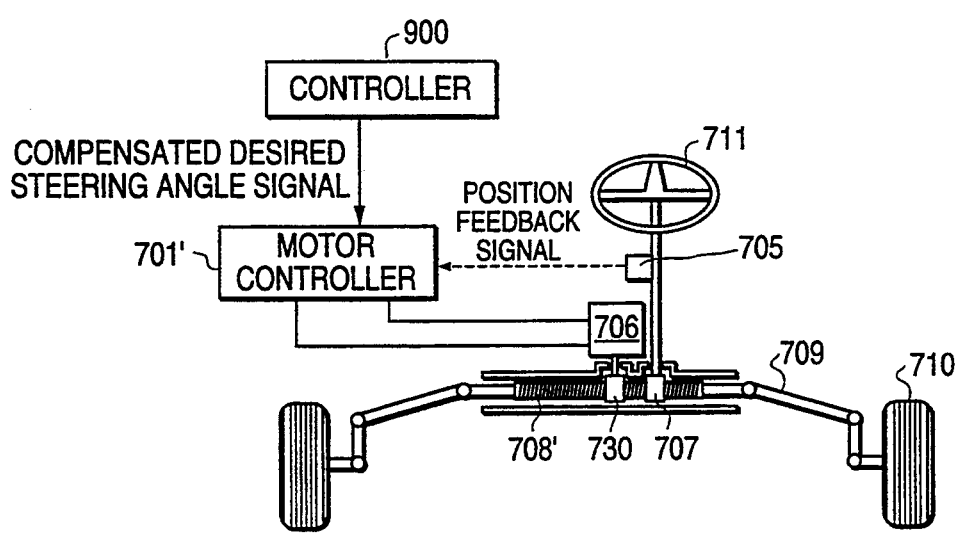
FIG. 9 shows a modification of the steering servo mechanism shown in FIG. 3.

With reference to FIGS. 2 and 3, the servo systems disclosed therein can also be used to provide automatic control with stability augmentation as shown in FIGS. 8 and 9. These drawings are identical, except valve controller 701 and motor controller 701' are shown as receiving the compensated desired steering angle calculated by controller 900. Controller 701 or 701' controls valve 713 or electric motor 706 to cause lateral movement of the steering rod to thereby steer the vehicle in accordance with the compensated steering angle, as discussed above. Since controller 701, 701' receives position feedback from sensors 705, the angle of the wheels can be corrected until the compensated desired angle equals the actual angle of the wheels. When automated control is not desired or possible, normal steering is allowed due to the switching of valve 715 in FIG. 17 which links pump 717 to valve 714, or due to the steering input being linked to motor controller 706 in FIG. 5. In the embodiments of FIGS. 8 and 9, separate movement of the steering rod relative to the rack is not needed to provide compensated automatic control. Also, steering torque sensor 704 could be provided as well to monitor for driver steering input.

This invention has been described in detail in connection with the preferred embodiments which are for illustrative purposes only and the invention is not limited thereto. It will be understood by those skilled in the art that variations and modifications can be made within the scope of this invention as defined by the appended claims.

I claim:

1. An apparatus for automatically guiding a moving vehicle along a road, said apparatus comprising:
    a steering mechanism;
    first means for steering the vehicle, said first means comprising a steering wheel which is mechanically connected with said steering mechanism, said first means steering the vehicle through said steering mechanism in accordance with a manually input steering wheel angle of said steering wheel; and
    second means for steering the vehicle, said second means calculating a desired steering angle for the vehicle based on the vehicle's position relative to the road, said second means mechanically connected with said steering mechanism and steering the vehicle through said steering mechanism in accordance with the calculated desired steering angle.

2. The apparatus recited in claim 1 further comprising a stability augmentation system means for determining a desired vehicle behavior condition based upon the desired steering angle, detecting an actual vehicle behavior condition, comparing the actual and desired vehicle behavior conditions, and correcting the desired steering angle so as to cause the actual and detected behavior conditions to be substantially equal.

3. The apparatus recited in claim 2, wherein, the actual vehicle behavior condition is the actual yaw rate of the vehicle and the desired vehicle behavior condition is the desired yaw rate of the vehicle.

4. The apparatus recited in claim 1, the vehicle including steerable wheels, wherein:
    said steering mechanism includes a steering rod linked to the steerable wheels of the vehicle, said steering rod having a rack portion thereon; and
    said first means includes a pinion gear interlinked with said rack portion and the steering wheel such that rotation of the steering wheel causes lateral movement of said steering rod to steer the steerable wheels.

5. The apparatus recited in claim 4, wherein, said second means includes a pressurized fluid circuit linked to said steering rod and causing lateral movement of said steering rod in accordance with the calculated desired steering angle.

6. The apparatus recited in claim 5, said fluid circuit linked to said first means and providing power steering in accordance with the manually input steering wheel angle.

7. The apparatus recited in claim 1, said second means calculating the desired steering angle based upon information received from a vehicle position sensing system which is indicative of the vehicle location relative to a road on which the vehicle is travelling, said second means comprising means for detecting when the vehicle position sensing system is malfunctioning during operation of said second means and for switching steering control of the vehicle to said first means.

8. The apparatus recited in claim 1, said second means including means for detecting when a steering wheel angle has been manually input at said steering wheel to provide steering control during operation of said second means and for switching steering control of the vehicle to said first means.

9. The apparatus recited in claim 8, said first means further comprising a steering shaft, said means for detecting and switching comprising a sensor which detects steering torque of said steering shaft.

10. The apparatus recited in claim 1 further comprising a stability augmentation system means for determining a desired vehicle behavior condition based upon the manually input steering wheel angle, detecting an actual vehicle behavior condition, comparing the actual and desired vehicle behavior conditions, and correcting the steering provided by said first means so as to cause the actual and detected behavior conditions to be substantially equal.

11. The apparatus recited in claim 10, wherein, the actual vehicle behavior condition is the actual yaw rate of the vehicle and the desired vehicle behavior condition is the desired yaw rate of the vehicle.

12. An apparatus for automatically guiding a moving vehicle, said apparatus comprising:
    a steering mechanism;
    first means for steering the vehicle, said first means comprising a steering wheel which is mechanically connected with said steering mechanism, said first means steering the vehicle through said steering mechanism in accordance with a manually input steering wheel angle of said steering wheel;

second means for steering the vehicle, said second means calculating a desired steering angle for the vehicle based upon information received from a vehicle position sensing system which is indicative of the vehicle location relative to a road on which the vehicle is travelling, said second means mechanically connected with said steering mechanism and steering the vehicle through said steering mechanism in accordance with the calculated desired steering angle; and said second means further comprising means for detecting when the vehicle position sensing system is inoperative during operation of said second means and for switching steering control of the vehicle to said first means when the sensing system is inoperative.

13. An apparatus for automatically guiding a moving vehicle, said apparatus comprising:

a steering mechanism;

first means for steering the vehicle, said first means comprising a steering wheel which is mechanically connected with said steering mechanism, said first means steering the vehicle through said steering mechanism in accordance with a manually input steering wheel angle of said steering wheel;

second means for steering the vehicle, said second means calculating a desired steering angle for the vehicle based upon information received from a vehicle position sensing system which is indicative of the vehicle location relative to a road on which the vehicle is travelling, said second means mechanically connected with said steering mechanism and steering the vehicle through said steering mechanism in accordance with the calculated desired steering angle; and said second means including means for detecting when a steering wheel angle has been manually input at said steering wheel to provide steering control during operation of said second means and for switching steering control of the vehicle to said first means when a steering wheel angle has been manually input.

14. An apparatus for automatically guiding a moving vehicle having steerable wheels, said apparatus comprising:

a steering mechanism including a steering rod linked to the steerable wheels of the vehicle;

means for manually steering the vehicle including a steering wheel and a first mechanical coupling interlinking said steering rod and said steering wheel, said first mechanical coupling causing lateral movement of said steering rod in accordance with rotation of said steering wheel to steer the steerable wheels;

means for automatically steering the vehicle, said means for automatically steering calculating a desired steering angle for the vehicle;

a second mechanical coupling interlinking said steering rod and said means for automatically steering, said second mechanical coupling causing lateral movement of said steering rod in accordance with the calculated desired steering angle to steer the steerable wheels; and switching means for switching between said means for manually steering and said means for automatically steering.

15. The apparatus recited in claim 14, said steering rod having a rack portion, said first mechanical coupling comprising a pinion gear interlinked with said rack portion.

16. An apparatus for automatically guiding a moving vehicle having steerable wheels, said apparatus comprising:

a steering mechanism including a steering rod linked to the steerable wheels of the vehicle;

means for manually steering the vehicle including a steering wheel and a mechanical coupling interlinking said steering rod and said steering wheel, said mechanical coupling causing lateral movement of said steering rod in accordance with rotation of said steering wheel to steer the steerable wheels;

means for automatically steering the vehicle, said means for automatically steering calculating a desired steering angle for the vehicle;

a hydraulic fluid circuit interlinking said steering rod and said means for automatically steering, said hydraulic fluid circuit causing lateral movement of said steering rod in accordance with the calculated desired steering angle to steer the steerable wheels; and switching means for switching between said means for manually steering and said means for automatically steering.

17. The apparatus recited in claim 16, said steering rod having a rack portion, said mechanical coupling comprising a pinion gear interlinked with said rack portion.

18. An apparatus for automatically guiding a moving vehicle along a road, said apparatus comprising:

a steering mechanism;

manual steering means for steering the vehicle, said manual steering means comprising a steering wheel which is mechanically connected with said steering mechanism, said manual steering means steering the vehicle through said steering mechanism in accordance with a manually input steering wheel angle of said steering wheel; and automatic steering means for automatically steering the vehicle, said automatic steering means including calculating means for calculating a desired steering angle for the vehicle independently of the manually input steering wheel angle, said automatic steering means further including actuating means for actuating said steering mechanism, said actuating means mechanically connected with said steering mechanism and electrically connected with said calculating means, said actuating means steering the vehicle through said steering mechanism in accordance with the desired steering angle calculated by said calculating means.

19. The apparatus recited in claim 18, said calculating means calculating the desired steering angle based upon information received from a vehicle position sensing system which is indicative of the vehicle location relative to the road on which the vehicle is travelling, said automatic steering means further comprising means for detecting when the vehicle position sensing system is malfunctioning during operation of said automatic steering means and for switching steering control of the vehicle to said manual steering means.

20. The apparatus recited in claim 18, said automatic steering means including means for detecting when a steering wheel angle has been manually input at said steering wheel to provide steering control during operation of said automatic steering means and for switching steering control of the vehicle to said manual steering means.

* * * * *